Sept. 30, 1947.  A. G. BLOCKER  2,428,260
JAR GRIP ATTACHMENT FOR CONTAINERS
Filed Aug. 13, 1945
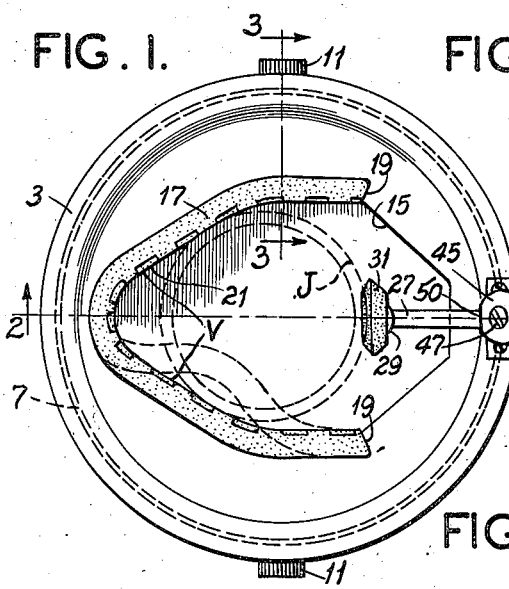
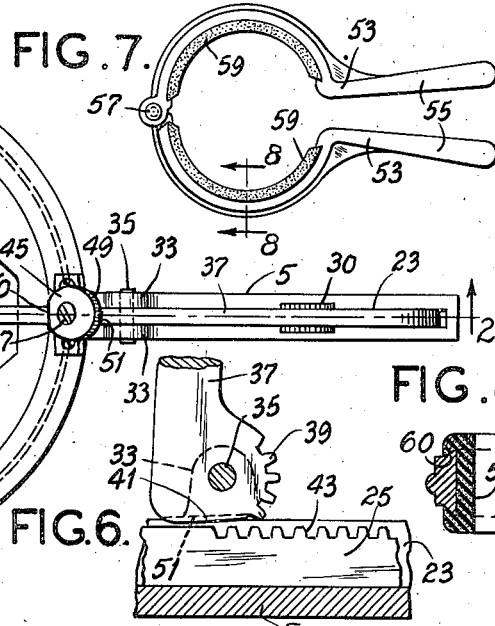
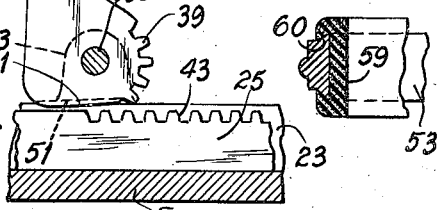
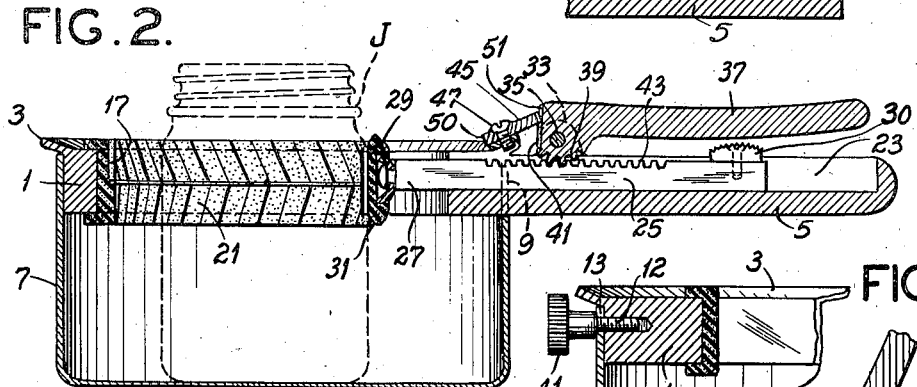
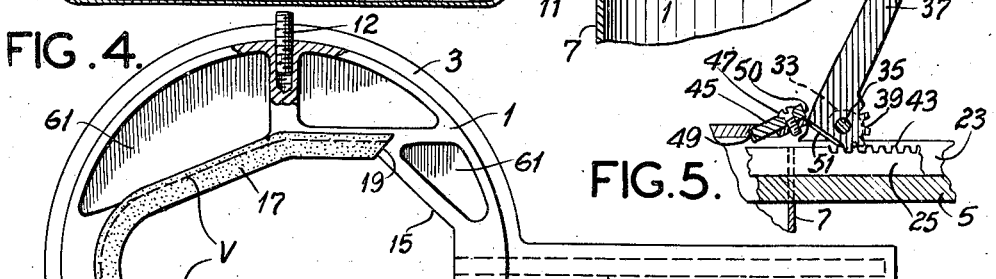
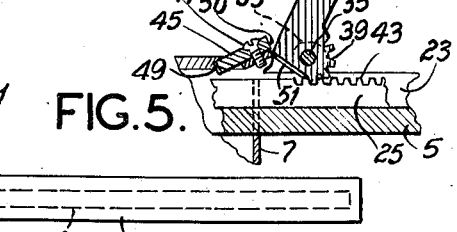
Andrew G. Blocker,
Inventor.
Haynes and Koenig
Attorneys.

Patented Sept. 30, 1947

2,428,260

UNITED STATES PATENT OFFICE 2,428,260

JAR GRIP ATTACHMENT FOR CONTAINERS

Andrew G. Blocker, St. Louis, Mo.

Application August 13, 1945, Serial No. 610,617

3 Claims. (Cl. 81—3.32)

1

This invention relates to jar grips, and with regard to certain more specific features, to safety grips of this class for canning and similar operations.

Among the several objects of the invention may be noted the provision of a handy jar grip whereby packed glass jars and the like, particularly hot ones, may be safely and securely gripped for the purpose of tightening their closures; the provision of a grip of the class described which will safely catch outflow of jar contents, particularly arising from mishaps that may occur in connection with defective jars or boiling over; the provision of a grip of the class described which may conveniently be applied and released with minimum effort and with minimum jar breakage; and the provision of a grip of this class which is sanitary and easily cleaned. Other objects will be in part obvious and in part pointed out hereinafter.

The invention accordingly comprises the elements and combinations of elements, features of construction, and arrangements of parts which will be exemplified in the structures hereinafter described and the scope of the application of which will be indicated in the following claims.

In the accompanying drawings, in which one of various possible embodiments of the invention is illustrated, Fig. 1 is a plan view of a jar grip shown in gripping position;

Fig. 2 is a vertical section taken on line 2—2 of Fig. 1;

Fig. 3 is an enlarged detail section taken on line 3—3 of Fig. 1;

Fig. 4 is a bottom plan view of a clamping ring removed from its assembled position;

Fig. 5 is a fragmentary detail view showing an operating handle in a different position from that shown in Fig. 2;

Fig. 6 is an enlarged fragmentary detail section of a part of Fig. 2 shown in a position alternate to that of Figs. 2 and 5;

Fig. 7 is a plan view of an auxiliary wrench; and,

Fig. 8 is an enlarged detail section taken on line 8—8 of Fig. 7.

Similar reference characters indicate corresponding parts throughout the several views of the drawings.

Many accidents occur in connection with the handling of hot jars and the like in canning processes. These accidents are due mainly to the awkwardness associated with screwing covers onto jars which have been hot-processed in loading them. The scalding contents sometimes spill over, and defective jars sometimes, while in the process of being screwed up, even break and injure the operator.

Referring now more particularly to the drawings, there is shown at numeral 1 a solid ring which is flanged at 3 and which carries a laterally extending rigid handle 5. This ring telescopes into the open mouth of a basin or container 7, the latter being more or less in the form of an ordinary cooking utensil. The flange 3 positions the ring 1 at the upper edge of the vessel 7. The handle 5 passes out of a notch 9 in the wall of the container. Thumb nuts 11 threaded onto studs 12 affixed to the ring 1 and cooperating with additional notches 13 in the upper edge of the vessel 7 form quick-detachable connecting means between the ring and opposite sides of the vessel. Thus the ring and handle assembly, when desired, may quickly be removed from the vessel 7 for cleaning purposes or the like. When assembled the device presents an appearance similar to an ordinary cooking utensil with its handle.

The ring 1, which may be made of aluminum, is preferably cored as shown at 61 in Fig. 4 in order to lighten it as much as possible. It includes an opening 15 which has the general V-shape on one side as shown at V. The handle 5 extends from the ring 1 opposite the V-shape.

Sprung into the V-shaped portion of the opening is a rubber or similarly resilient strip 17 which has a grooved cross section such as shown in Fig. 2. This forms a resilient liner for the V-shape of the opening. Initially this strip is formed slightly longer than the perimeter of the V-shape between two notches 19 (see Fig. 1) so that the liner may be applied by springing it from the dotted-line position shown in Fig. 1 to to the solid-line position, wherein it remains sprung in place. However, it may be removed at will for cleaning purposes.

The inside of the strip is provided with a suitable tread 21 to enhance its resilient gripping quality.

The handle 5 is provided on its upper surface with a guide groove 23 in which slides a rack bar 25 having rack teeth 43. This groove communicates with the opening 15. The inner end 27 of the bar 25 extends from the groove into the opening 15. This end is provided with a swivel head 29 having a resilient rubber facing piece 31 which is designed to be sprung into position or removed for cleaning purposes. The outer end of the rack bar 25 carries a knurled thumb piece 30 for pushing the bar in and out.

The handle 5 near its inner end is formed with two spaced bearing lugs 33 which support a pin 35. A lever or handle 37 is pivoted on the pin 35. Around the pin the handle is formed as a sector gear 39 adapted to mesh with the rack teeth 43. Adjacent to the sector gear 39 the handle 37 is formed with a portion 41 which, when the handle 37 is up (Fig. 6), clears the bar 25 and allows it to be moved freely in the groove 23. When the operating handle 37 is moved down towards the rigid handle 5, the sector gear 39 engages the teeth 43 of the rack bar 25, thus driving the latter inward from any one of various selected starting positions. The start of engagement is shown in Fig. 5. The purpose of this is to squeeze the resilient head 31 into engagement with a member such as the jar J indicated by dotted lines in Figs. 1 and 2. This squeezing by operation of handle 37 occurs after the bar 25 has been pushed by means of the thumb piece 30 loosely near to the jar. The squeeze from handle 37 pushes the jar into gripped engagement with the V-shaped liner 17. The resulting three-point resilient grip is consistently the same on various sizes of jars and the like.

In order to provide a convenient lock for maintaining a gripped condition from pressure on the handle 37, ring 1 is provided (near the part 41) with an eccentrically mounted disc 45 which is rotary on a pin 47. The eccentric edge of this disc is serrated as shown at 49. The flat part 41 of the lever 37 has serrations 51 which extend vertically for cooperative engagement with the serrations 49 after the lever and eccentric are rotated from the Fig. 5 to the Fig. 2 position. This is after the handle 37 has been squeezed down to the maximum extent possible under the circumstances. The handle 37 will assume various final positions, depending upon the initial adjustment that was given to the slide bar 25 when the handle 37 was in the Fig. 6 position.

In Figs. 7 and 8 is shown a type of clamp or wrench which may be used to turn the jar cover. This constitutes, for example, two semicircular members 53 having handles 55 and pinned at 57. These are provided interiorly with liners 59 having tongue and grooved connections 60, as illustrated in Fig. 8.

Operation is as follows:

A jar J to be gripped and capped is inserted through the opening 15 and caused to rest upon the bottom of the vessel 7. The vessel may be empty or supplied with a temperature control medium such as hot water. With the operating handle 37 in the up position (Fig. 6) the rack bar 25 is directly pushed inward by means of button 30 until the resilient button 31 is near the jar. Thereafter the operator squeezes together the handles 5 and 37, depressing the latter. This causes the sector 39 to engage the rack teeth 43 and force the bar forward, thereby effecting a resilient clamping action on jar J, with some mechanical advantage. At this time the eccentric grip 45 is moved to the position shown in Fig. 2, wherein its serrations 49 lock with the serration 51, thus holding the operating handle 37 in locking position. The operator's one hand is then free to hold rigid handle 5 as a lever. Finally, a suitable cover may be applied to the jar J by means of the wrench of Figs. 7 and 8. Other wrenches may of course be used.

If spilling of the contents of the jar should occur during the application of the cover, these will be caught by the vessel 7. Or, if a jar should be defective and break during the operation, the operator's hand which holds the handle 5 as a wrench as the cap is applied is safe. The hand holding the wrench is also safe. In addition, anything spilled due to breakage, including glass particles, will be caught by the container 7.

Upon completing a closing operation on a jar, release is effected by slightly further pushing down the operating handle 37 to disengage the serrations 49 and 51 and then turning the eccentric locking disc 45 180° away from its locking position. This releases the handle 37 for upward movement and retraction of the bar 25. It will be noted that the eccentric disc 45 is provided opposite its highest point of serration with a flat portion 50 which allows free upward movement of the operating handle 37 to the position shown in Fig. 5 wherein the teeth of its sector 39 will clear the teeth 43 of the bar 25. This allows free sliding movement of the bar 25 by a finger on the button 30.

One advantage of the means shown for locking the operating handle 37 is that while one hand is gripping together the handles 37 and 5, the pointer finger of that same hand may operate the eccentric 45 either to latching or releasing positions.

It will be understood that although the bottom of the ring 1 is shown as being provided with the recesses 61 to reduce its weight, these if desired could be caused to pass entirely through the ring, or if weight were unimportant they could be eliminated.

Although the ring 1 is shown as being of round outer shape, it will be understood that it might have other shapes to correspond with other shapes of containers, such as for example square or rectangular. The primary feature in this respect is that the outer shape of the ring 1 is such as to cooperate with the upper edge of the vessel 7 and that it has a shaped opening through it opposite slider 25 for the reception of the jar or the like to be clamped. The term annular is intended to cover any of said various shapes. The V-shape for the opening is preferable since it will accommodate several jar sizes and with resilient head 31 provide in all cases resilient three-point contact.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A jar grip comprising a rigid annular member adapted to be telescoped into the open mouth of a container and having a flange adapted to engage the rim of the container, said member having an opening therethrough for receiving a jar, a handle extending outward from said member, a slide associated with the handle extending into said opening, the end of said slide within said opening being provided with means for engaging a jar and clamping it within said opening, a lever pivoted on and above said handle, said slide and lever being provided with cooperable gear means adapted to engage when the lever is depressed toward the handle and to move the slide inward, said gear means being disengaged when the lever is in a raised position to allow free movement of the slide.

2. A jar grip comprising a rigid annular member adapted to be telescoped into the open mouth of a container and having a flange adapted to engage the rim of the container, said member having a V-shaped opening therethrough for receiving a jar, a handle extending outward from said member opposite the apex of the opening, a slide associated with the handle extending into said opening, the end of said slide within said opening being provided with means for engaging a jar and wedging it into the V-shaped opening, a lever pivoted on and above said handle, said slide and lever being provided with cooperable gear means adapted to engage when the lever is depressed toward the handle and to move the slide inward, said gear means being disengaged when the lever is in a raised position to allow free movement of the slide, and a quick-release latch carried by said member for locking the lever in various positions of engagement of said gear means.

3. A jar grip comprising a relatively deep container, a rigid annular member telescoped into the open mouth of the container and having a flange engaging the rim of the container, means detachably securing said member within the mouth of said container, said member having an opening therethrough for receiving a jar, said member being provided with a handle extending outward therefrom beyond the container, said handle extending through a notch in the container at its mouth, a slide associated with said handle extending into said opening, the end of said slide within the opening being provided with means for engaging a jar and clamping it within the opening, and means including a lever pivoted on and above said handle for forcing said slide inward to clamp a jar.

ANDREW G. BLOCKER.

REFERENCES CITED

The following references are of record in the file of this patent:

UNITED STATES PATENTS

| Number | Name | Date |
|---|---|---|
| 31,065 | Lewis | Jan. 1, 1861 |
| 354,705 | Kenderdine | Dec. 21, 1886 |
| 370,447 | Brown | Sept. 27, 1887 |
| 490,789 | Huston | Jan. 31, 1893 |
| 636,661 | Guest | Nov. 7, 1899 |
| 736,455 | Stork | Aug. 18, 1903 |
| 972,091 | Baguley | Oct. 4, 1910 |
| 1,394,033 | McLeod et al. | Oct. 18, 1921 |
| 1,445,441 | Lauritsen | Feb. 13, 1923 |
| 1,785,436 | Carlson | Dec. 16, 1930 |
| 2,014,108 | Hawke | Sept. 10, 1935 |
| 2,340,330 | Kipper | Feb. 1, 1944 |